(12) United States Patent
Watahiki et al.

(10) Patent No.: US 11,552,371 B2
(45) Date of Patent: Jan. 10, 2023

(54) BATTERY MODULE

(71) Applicant: VEHICLE ENERGY JAPAN INC., Hitachinaka (JP)

(72) Inventors: Yoshitaka Watahiki, Hitachinaka (JP); Takayuki Suzuki, Hitachinaka (JP)

(73) Assignee: VEHICLE ENERGY JAPAN INC., Ibaraki (JP)

(*) Notice: Subject to any disclaimer, the term of this patent is extended or adjusted under 35 U.S.C. 154(b) by 154 days.

(21) Appl. No.: 16/652,840

(22) PCT Filed: Oct. 1, 2018

(86) PCT No.: PCT/JP2018/036639
§ 371 (c)(1),
(2) Date: Apr. 1, 2020

(87) PCT Pub. No.: WO2019/069837
PCT Pub. Date: Apr. 11, 2019

(65) Prior Publication Data
US 2020/0321589 A1    Oct. 8, 2020

(30) Foreign Application Priority Data
Oct. 5, 2017   (JP) .............................. JP2017-195514

(51) Int. Cl.
*H01M 50/502*   (2021.01)
*H01R 11/01*   (2006.01)
(Continued)

(52) U.S. Cl.
CPC ......... *H01M 50/502* (2021.01); *H01M 50/20* (2021.01); *H01M 50/543* (2021.01);
(Continued)

(58) Field of Classification Search
CPC ....... H01R 13/68; H01R 11/01; H01M 50/20; H01M 50/572; H01M 50/543; H01M 50/502
See application file for complete search history.

(56) References Cited

U.S. PATENT DOCUMENTS

2013/0175071 A1* 7/2013 Shiba ..................... H01B 13/00
                                                                     174/126.2
2015/0380713 A1* 12/2015 Kimura ................. H01G 11/10
                                                                     429/121
(Continued)

FOREIGN PATENT DOCUMENTS

JP    2012-138239 A    7/2012
JP    2013-073929 A    4/2013
(Continued)

OTHER PUBLICATIONS

Extended European Search Report dated May 11, 2021 for European Patent Application No. 18865211.9.
(Continued)

*Primary Examiner* — Oscar C Jimenez
*Assistant Examiner* — Paul D Baillargeon
(74) *Attorney, Agent, or Firm* — Volpe Koenig

(57) ABSTRACT

Provided is a battery module that prevents a new current path that may be formed due to molten metal resulting from a molten and cut fuse, and has better safety than conventional battery modules. A battery module includes: module terminals; a battery cell group including a plurality of battery cells; and a plurality of bus bars connecting the plurality of battery cells of this battery cell group and connecting this battery cell group with the module terminals. At least one of the plurality of bus bars has a fuse. The battery module has a space that is located below the fuse and that allows the molten fuse to fall.

11 Claims, 14 Drawing Sheets

(51) Int. Cl.
    *H01R 13/68*     (2011.01)
    *H01M 50/20*     (2021.01)
    *H01M 50/543*     (2021.01)
    *H01M 50/572*     (2021.01)

(52) U.S. Cl.
    CPC .......... *H01M 50/572* (2021.01); *H01R 11/01* (2013.01); *H01R 13/68* (2013.01)

(56) References Cited

U.S. PATENT DOCUMENTS

| | | | |
|---|---|---|---|
| 2016/0104873 A1* | 4/2016 | Smythe | H01M 10/425 |
| | | | 429/56 |
| 2016/0211499 A1* | 7/2016 | Cho | H01M 50/502 |
| 2019/0334261 A1* | 10/2019 | Fees | H01M 50/572 |

FOREIGN PATENT DOCUMENTS

| | | |
|---|---|---|
| JP | 2013-196932 A | 9/2013 |
| JP | 2015-141801 A | 8/2015 |
| JP | 2016-066455 A | 4/2016 |
| JP | 2016-225065 A | 12/2016 |
| JP | 2017-084606 A | 5/2017 |

OTHER PUBLICATIONS

International Search Report, PCT/JP2018/036639, dated Jan. 22, 2019, 2 pgs.

\* cited by examiner

BATTERY MODULE

TECHNICAL FIELD

The present invention relates to battery modules each having a plurality of battery cells.

BACKGROUND ART

Conventionally inventions about a battery module to be mounted on an electric vehicle, for example, have been known (see Patent Literature 1). The battery module according to this invention includes a plurality of secondary cells and a metal bus bar connecting terminals of the plurality of secondary cells. The bus bar includes connections to connect to the terminals of the secondary cells and a body having the plurality of connections. Each connection is integrally formed with a fuse to be disposed between the connection and the body (see this literature, claim 1, for example). According to this invention, each connection of the bus bar to connect to a corresponding terminal of a secondary cell is integrally formed with a fuse, and this configuration suppresses an increase in the number of components of the configuration having a fuse disposed for each of the secondary cells (see this literature, paragraph 0014, for example).

Inventions about an electric storage device including a plurality of battery cells and bus bars also have been known (see Patent Literature 2). The electric storage device according to this invention includes: a first cell block including a plurality of battery cells; a second cell block including other plurality of battery cells; and a bus bar electrically connecting the plurality of battery cells in the first cell block and the plurality of battery cells in the second cell block. The bus bar includes a first bus bar part, a second bus bar part, and a third bus bar part.

The first bus bar part connects one of the positive electrodes and the negative electrodes of the plurality of battery cells in the first cell block via fuses. The second bus bar part connects the other of the positive electrodes and the negative electrodes of the plurality of battery cells in the second cell block. The third bus bar part includes a first part adjacent to the first bus bar part and a second part closer to the second bus bar part than the first part, and the third bus bar part connects the first bus bar and the second bus bar part. The second part of this third bus bar part radiates heat more than the first part does (see this literature, claim 1, for example).

According to this structure, a part closer to the fuse (the first part) of the third bus bar part radiates less heat, and a part away from the fuse (the second part) radiates more heat. This means that the part closer to the fuse (the first part) is not restricted for the fuse function, such as a current value during the current interruption, and the fuse therefore fulfills the original function. The part away from the fuse (the second part) radiates more heat. This reduces heat generated at the fuse effectively due to the radiative effect so as to suppress the transmission of heat to other battery cells (see this literature, paragraph 0011, for example).

CITATION LIST

Patent Literature

Patent Literature 1: JP 2015-141801 A
Patent Literature 2: JP 2016-066455 A

SUMMARY OF INVENTION

Technical Problem

These conventional battery module and electric storage device melt and cut the fuse during short-circuit, and open the short-circuit. Molten metal resulting from the molten and cut fuse, however, may form a new current path, and this may cause short-circuit again.

The present invention provides a battery module that prevents a new current path that may be formed due to molten metal resulting from a molten and cut fuse, and has better safety than conventional battery modules.

Solution to Problem

To fulfil the aim, a battery module according to the present invention includes: a module terminal; a battery cell group including a plurality of battery cells; and a plurality of bus bars connecting the plurality of battery cells of the battery cell group and connecting the battery cell group with the module terminal, at least one of the plurality of bus bars having a fuse, the battery module having a space below the fuse and receiving the fuse when the fuse melts and falls.

Advantageous Effects of Invention

If excessive current flows through the fuse of the battery module of the present invention due to short-circuit, for example, the fuse melts and cuts due to the Joule heat. The battery module of the present invention has a space that is below the fuse and allows the molten fuse to fall. Metal of the fuse that melts due to the Joule heat will fall down into the space due to the action of gravity. In this way the present invention provides the battery module that prevents a new current path that may be formed due to molten metal, and has better safety than conventional battery modules.

DESCRIPTION OF EMBODIMENTS

Figure 1:
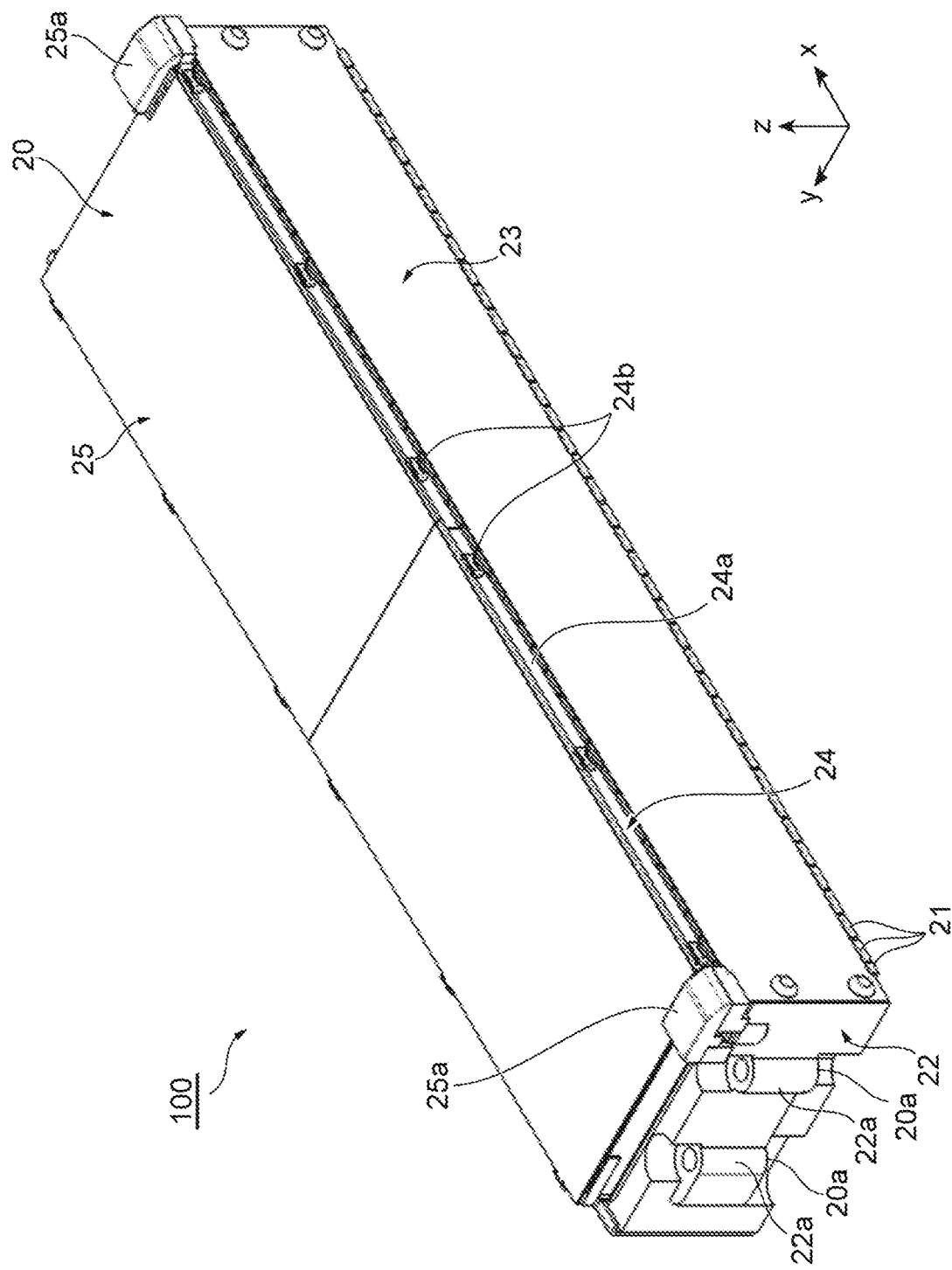
FIG. 1 is a perspective view illustrating the appearance of a battery module according to Embodiment 1 of the present invention.

The following describes several embodiments of a battery module according to the present invention, with reference to the drawings. The following may describe various parts of the battery module while referring to the orthogonal coordinate system having x axis, y axis, and z axis as shown in the drawings. In the following descriptions, directional terms, such as upper, lower, left, right, front, and rear, are used for convenience to explain the state of the battery module shown in the drawings, and these terms do not limit the posture and the arrangement of the battery module.

Embodiment 1

Figure 2:
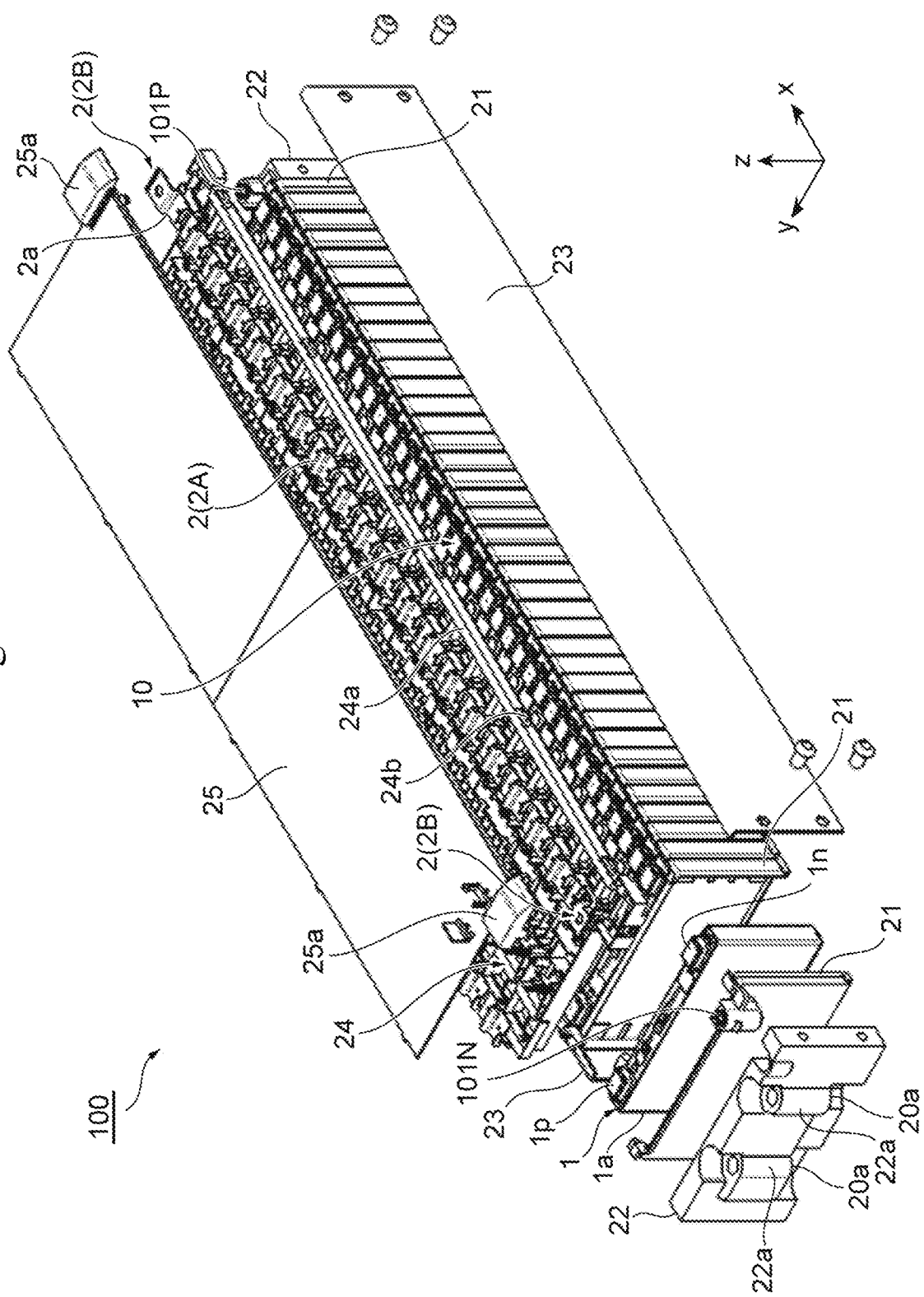
FIG. 2 is an exploded perspective view of the battery module in FIG. 1.

FIG. 1 is a perspective view showing the appearance of a battery module 100 according to Embodiment 1 of the present invention. FIG. 2 is an exploded perspective view of the battery module 100 in FIG. 1.

The battery module 100 of the present embodiment mainly includes: module terminals 101P and 101N; a battery cell group 10 including a plurality of battery cells 1; and bus bars 2 connecting the plurality of battery cells 1 of this battery cell group 10 and connecting this battery cell group 10 with the module terminals 101P and 101N. Although described later in details, the battery module 100 of the present embodiment has a major feature that at least one of the plurality of bus bars 2 includes a fuse 2a and the battery module has a space S (see FIG. 4) below the fuse 2a where the molten fuse 2a to fall.

The following describes the structure of various parts of the battery module 100 of the present embodiment in more details. The battery module 100 of the present embodiment includes a housing 20 and an electronic circuit board not shown in addition to the module terminals 101P and 101N, the battery cell group 10, and the plurality of bus bars 2 as stated above.

In one example, the battery cell group 10 is configured so that flattened rectangular battery cells 1, i.e., thin hexahedral or cuboid battery cells 1 having the thickness smaller than the width and the height, are stacked in the thickness direction (x-axis direction). In one example, each battery cell 1 is a rectangular lithium-ion secondary battery, and includes a flattened rectangular cell case 1a, an electrode group and electrolyte not shown that are stored in this cell case 1a, and a pair of cell terminals 1p and 1n connecting to the electrode group and disposed on the vertically upper end face of the cell case 1a.

The cell terminals 1p and 1n of the battery cell 1 each have a substantially cuboid and three-dimensional shape that protrudes vertically from the upper end face of the cell case 1a. A resin insulating member is disposed between the cell terminals 1p, 1n and the cell case 1a or between the cell case 1a and the electrode group for electrical insulation. The plurality of battery cells 1 making up the battery cell group 10 are stacked while reversing their direction by 180° so that the positive cell terminal 1p of one of mutually adjacent battery cells 1 and the negative cell terminal 1n of the other battery cell 1 are adjacent to each other in the stacking direction (x-axis direction).

The housing 20 of the battery module 100 has a substantially cuboid shape, having the dimension in the length direction (x-axis direction) that is larger than the dimension in the width direction (y-axis direction) and the dimension in the height direction (z-axis direction), and holds the plurality of battery cells 1 making up the battery cell group 10. Specifically the housing 20 has a plurality of cell holders 21, a pair of end plates 22, a pair of side plates 23, an insulation cover 24 and a module cover 25, for example.

In one example, the cell holders 21 are made of a resin material, such as polybutylene terephthalate (PBT). In one example, each cell holder 21 intervenes between mutually adjacent battery cells 1 in the plurality of battery cells 1 stacked in the thickness direction (x-axis direction), and holds these battery cells 1 to sandwich them from both sides in the thickness direction (x-axis direction). The module terminals 101P and 101N, which can be external terminals of the battery module 100, are disposed at a pair of cell holders 21 that are at both ends of the battery cell group 10 in the stacking direction (x-axis direction) of the plurality of battery cells 1 making up the battery cell group 10.

In one example, the pair of end plates 22 includes plate-like members made of metal. The pair of end plates 22 is disposed at both ends of the battery cell group 10 via the pair of cell holders 21 disposed at both ends of the battery cell group 10 in the stacking direction (x-axis direction) of the plurality of battery cells 1 making up the battery cell group 10. Each of the end plates 22 as a pair has one face that is opposed to the plurality of battery cells 1 held at the cell holders 21. The other face of the end plate 22 is directed to the outside that is on the other side of the battery cell group 10, and has a fixing part 22a.

The fixing part 22a at each of the end plates 22 as a pair is substantially cylindrical, and a part of the cylindrical face protrudes outward from the outer face of the end plate 22. The cylindrical fixing part 22a has a bolt-hole that is bored along the center axis parallel to the height direction (z-axis direction) of the end plate 22. This fixing part 22a of the end plate 22 is to fix the battery module 100 to an external mechanism, such as a vehicle or another machine. The lower end face of this fixing part 22a of the end plate 22 is a supported face 20a of the housing 20 that is supported by the external mechanism as stated above.

That is, to fix the battery module 100 to the external mechanism, the operator may place the supported face 20a of the housing 20, which is the bottom face of the fixing part 22a of the end plate 22, on the external mechanism for supporting, and insert a bolt into the bolt-hole of the fixing part 22a and screw the bolt together with an internal thread or a nut of the external mechanism for fastening. In other words, the battery module 100 is fixed to the external mechanism with the bolt, and is supported by the external mechanism at the supported face 20a of the housing 20 that is the lower end face of the fixing part 22a of the end plate 22.

In one example, when the battery module 100 is mounted on a vehicle, such as an electric vehicle or a hybrid vehicle, the external mechanism to fix the battery module 100 is the vehicle body of such a vehicle. Although not limited especially, when the vehicle to fix the battery module 100 is placed on a horizontal road surface, for example, the length direction (x-axis direction) and the width direction (y-axis direction) of the housing 20 of the battery module 100 are substantially parallel to the horizontal direction, and the height direction (z-axis direction) of the housing 20 of the battery module 100 is substantially parallel to the vertical direction. In this state, the supported face 20a of the housing 20 is substantially parallel to the horizontal plane.

The pair of side plate 23 is disposed at both ends of the plurality of battery cells 1 making up the battery cell group 10 in the width direction (y-axis direction) via the cell holders 21. The side plates 23 as a pair are metal members each having a substantially rectangular shape, and are disposed to be mutually opposed at both ends of the housing 20 in the width direction (y-axis direction). The side plates 23 as a pair are substantially oblongs, having the long-side direction, i.e., longitudinal direction in the stacking direction (x-axis direction) of the plurality of battery cells 1 making up the battery cell group 10 and the short-side direction, i.e., transverse direction in the height direction (z-axis direction) of the plurality of battery cells 1 making up the battery cell group 10. The pair of side plates 23 are fastened at both end parts in the longitudinal direction to the pair of end plates 22 by fasteners, such as rivets and bolts, and engage with recess-like grooves of the cell holders 21 at both end parts in the transverse direction.

The insulation cover 24 is a plate-like member made of resin, such as PBT, having an electrical insulating property. The insulation cover 24 is disposed to be opposed to the upper end face of each cell case 1*a* having the cell terminals 1*p* and 1*n* of the battery cell 1. The insulation cover 24 has openings to expose the upper end faces of the cell terminals 1*p* and 1*n* of the plurality of battery cells 1 and a partition wall for insulation between the cell terminals 1*p* and 1*n* of the mutually adjacent battery cells 1 and between the mutually adjacent bus bars 2. In one example, the partition wall of the insulation cover 24 is disposed so as to surround the cell terminals 1*p* and 1*n* of the battery cells 1 and the bus bars 2. Various types of electric wiring is placed on the insulation cover 24 to connect to the battery cell group 10 and the electronic circuit board.

In one example, the electronic circuit board not shown is disposed between the insulation cover 24 and the module cover 25, i.e., on the other side of the insulation cover 24 relative to the battery cell group 10 in the height direction of the housing 20, and connects to the bus bars 2 via electric wiring.

The bus bars 2 connect the plurality of battery cells 1 of the battery cell group 10 and connect the battery cell group 10 to the module terminals 101P and 101N. Specifically the bus bars 2A between the battery cells 1 to connect the plurality of battery cells 1 of the battery cell group 10 connect to the upper end faces of the cell terminals 1*p* and 1*n* of the plurality of battery cells 1 of the battery cell group 10 that are exposed through the insulation cover 24 by welding, for example. In one example, the plurality of bus bars 2A between the battery cells 1 each connect the positive cell terminal 1*p* of one of mutually adjacent battery cells 1 in the stacking direction and the negative cell terminal 1*n* of the other battery cell 1, so as to connect all of the battery cells 1 in series. The bus bars 2A between the battery cells 1 may connect to the cell terminals 1*p* and 1*n* of the battery cells 1 via fasteners, such as bolts and rivets.

The bus bars 2B as a pair connect the battery cell group 10 to the module terminals 101P and 101N. To this end, ends of the bus bars 2B connect to a pair of battery cells 1 disposed at both ends of the plurality of battery cells 1 in the stacking direction at the positive cell terminal 1*p* of one of the battery cells 1 and at the negative cell terminal 1*n* of the other battery cell 1. In one example, these ends of the bus bars 2B as a pair connect to the upper end faces of the cell terminals 1*p* and 1*n* of the battery cells 1 by welding. The other ends of the bus bars 2B as a pair connect to the positive module terminal 101P and the negative module terminal 101N disposed at both ends of the plurality of battery cells 1 making up the battery cell group 10 in the stacking direction with a fastener, such as a rivet or a bolt. These positive module terminal 101P and negative module terminal 101N are external terminals of the battery module 100.

The module cover 25 is a plate-like member made of resin, such as PBT, having an electrical insulating property. The module cover 25 is disposed at the upper end of the housing 20 on the other side of the battery cell group 10 in the height direction (z-axis direction) of the housing 20 so as to cover the insulation cover 24 and the electronic circuit board. The module cover 25 has terminal covers 25*a* at the positions corresponding to the module terminals 101P and 101N at both ends of the plurality of battery cells 1 making up the battery cell group 10 in the stacking direction (x-axis direction), and the terminal covers 25*a* cover the module terminals 101P and 101N from the above. In one example, the module cover 25 is fixed to the upper part of the insulation cover 24 by engaging the hooks 24*b* disposed at the frame 24*a* of the insulation cover 24 with the side edge of the module cover 25.

In this way, the battery module 100 of the present embodiment is configured so that the flattened rectangular battery cells 1 making up the battery cell group 10 are stacked in the thickness direction (x-axis direction), and the module terminals 101P and 101N are disposed at both ends of the battery cell group 10 in the stacking direction (x-axis direction) of the battery cells 1. The battery module 100 connects to an external electric generator or electric motor via these positive module terminal 101P and negative module terminal 101N, and exchanges electricity with such an external electric generator or electric motor. The following describes features of the battery module 100 of the present embodiment in more details.

Figure 3:
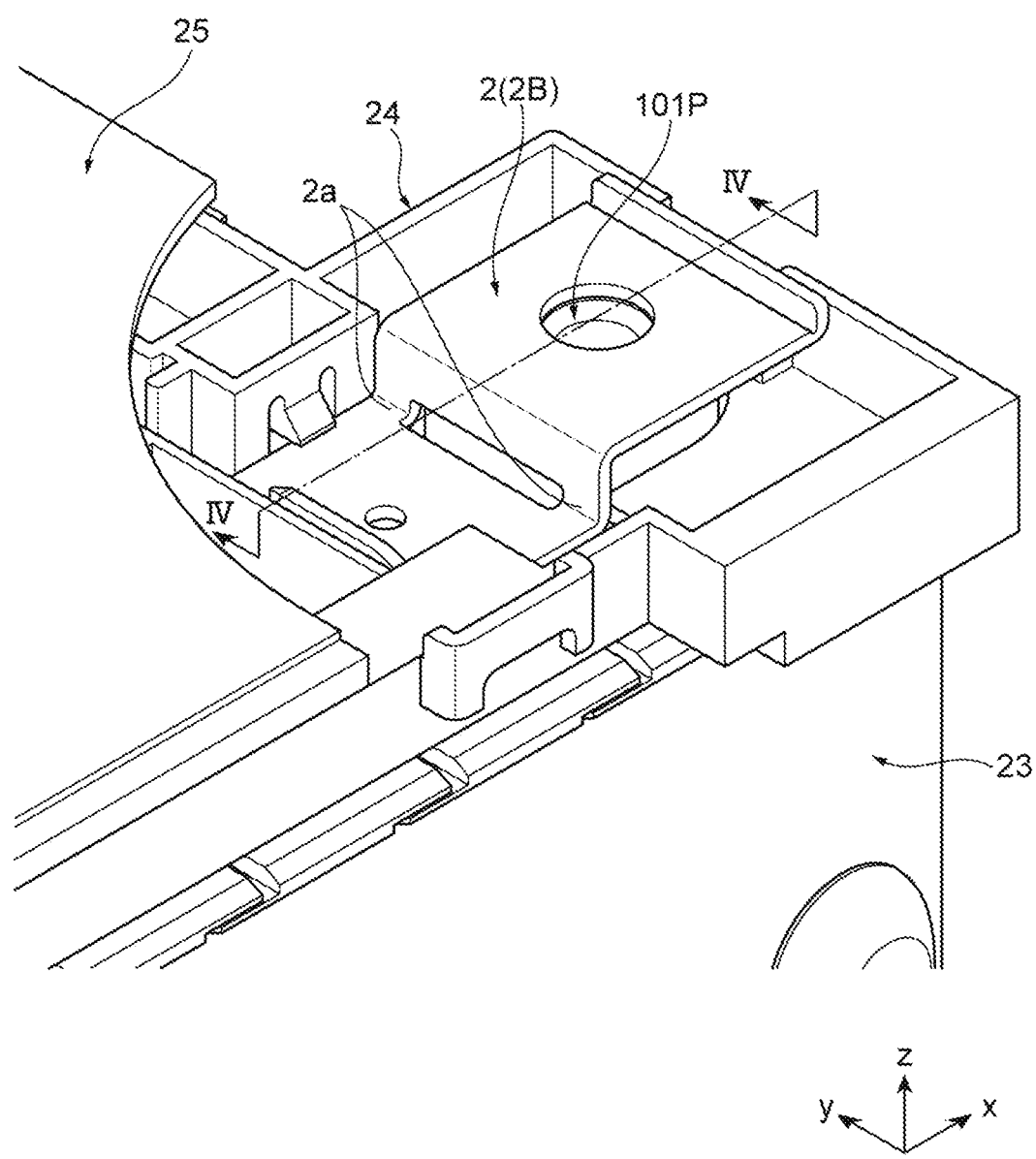
FIG. 3 is an enlarged perspective view of a module terminal of the battery module in FIG. 1.
Figure 4:
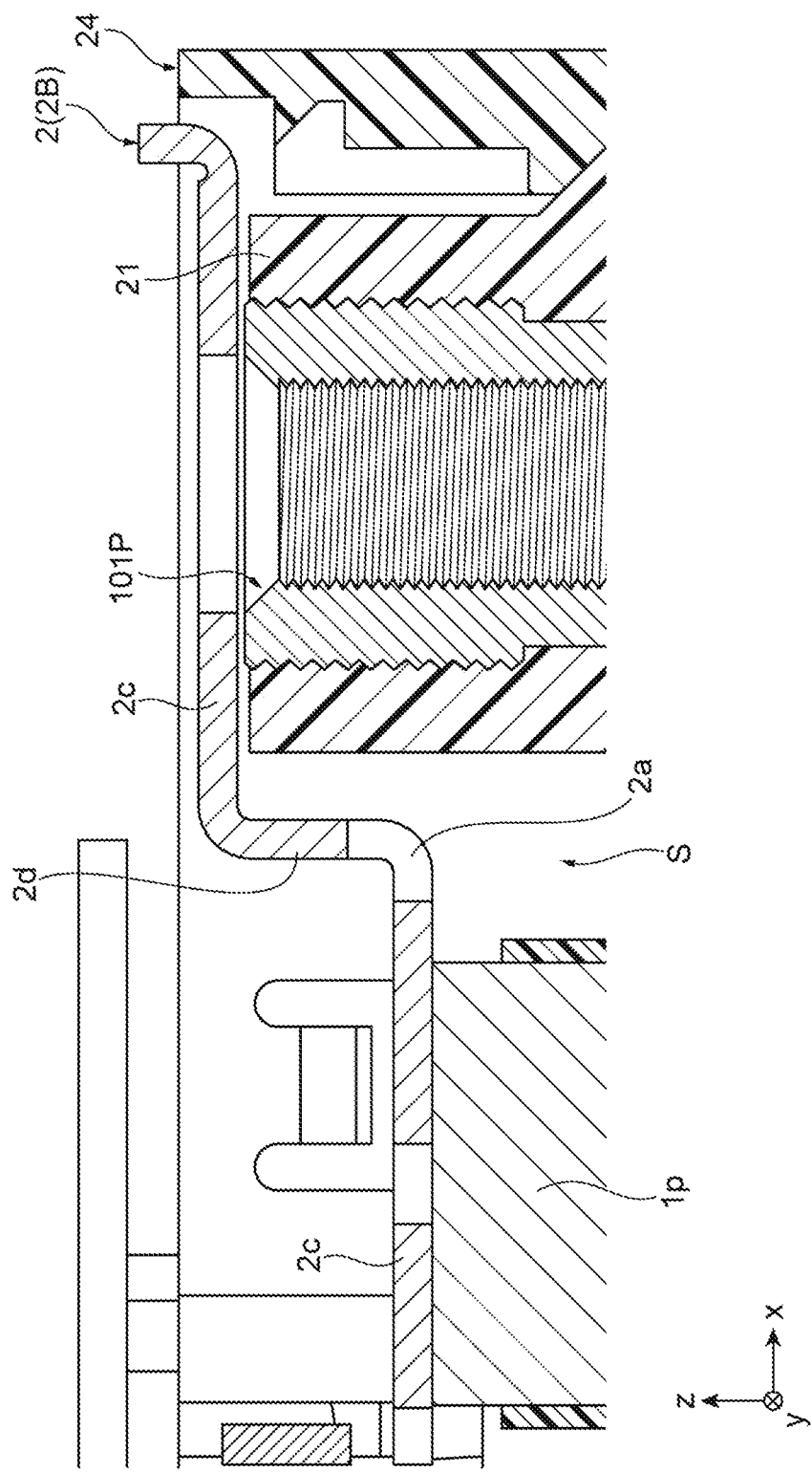
FIG. 4 is an enlarged cross-sectional view of the module terminal taken along the line IV-IV of FIG. 3.
Figure 5:
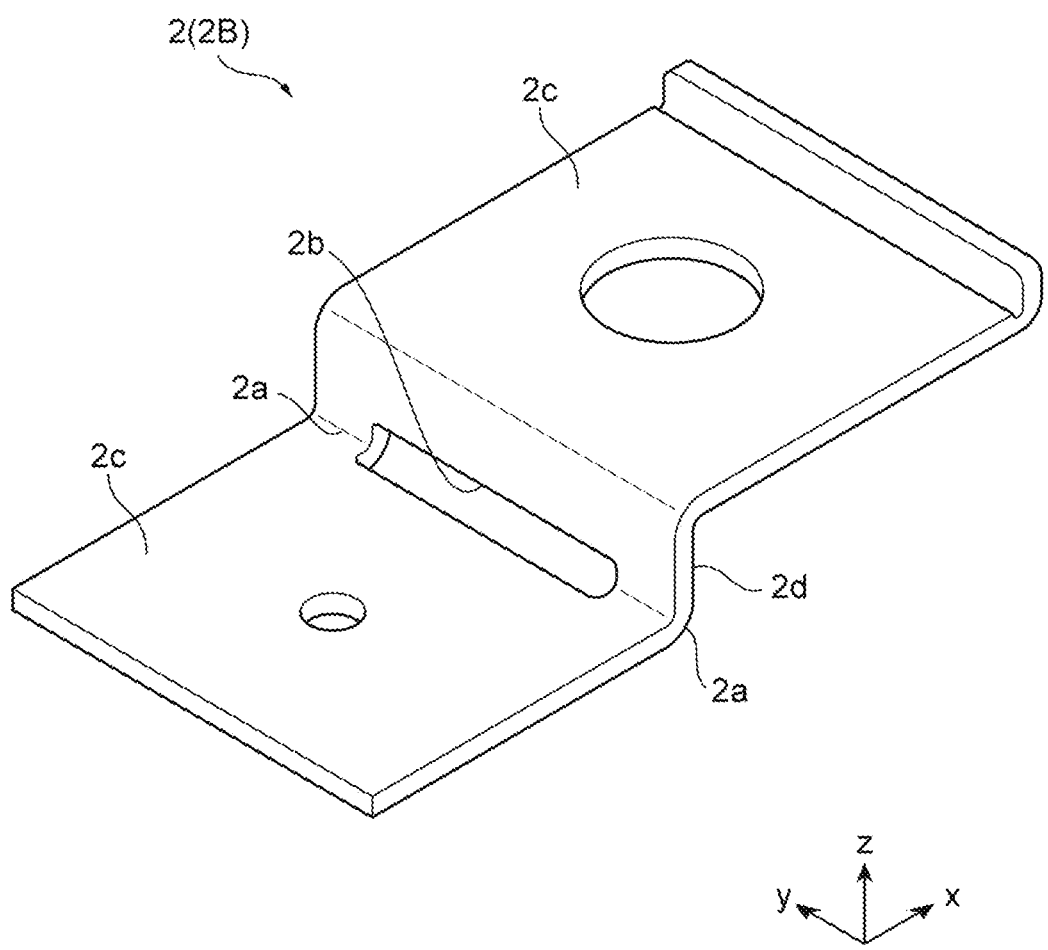
FIG. 5 is a perspective view of the bus bar connecting to the module terminal shown in FIG. 3.

FIG. 3 is an enlarged perspective view of the module terminal 101P of the battery module 100 shown in FIG. 1. FIG. 4 is an enlarged cross-sectional view of the module terminal 101P taken along the line IV-IV of FIG. 3. FIG. 5 is a perspective view of the bus bar 2B connecting to the module terminal 101P shown in FIG. 3. FIG. 3 shows the module cover 25 that is partially cut out at the terminal cover.

As stated above, the battery module 100 of the present embodiment includes: the module terminals 101P and 101N; the battery cell group 10 including the plurality of battery cells 1; and the bus bars 2 connecting the plurality of battery cells 1 of this battery cell group 10 and connecting this battery cell group 10 with the module terminals 101P and 101N. At least one of the plurality of bus bars 2 has the fuse 2*a*, and the battery module has a space S below the fuse 2*a* where the molten fuse 2*a* to fall. The term "below" refers to vertically below when the battery module 100 is placed so that the supported face 20*a* of the housing 20 is horizontal.

In one example, the fuse 2*a* of the battery module 100 of the present embodiment is disposed at one of the bus bars 2B as a pair connecting the battery cell group 10 to the module terminals 101P and 101N. Specifically the fuse 2*a* may be disposed at the bus bar 2B connecting the positive cell terminal 1*p* of one of the battery cells 1 that are disposed at both ends of the plurality of battery cells 1 making up the battery cell group 10 in the stacking direction (x-axis direction) to the positive module terminal 101P, for example. The fuse 2*a* may be disposed at the bus bar 2B connecting the negative cell terminal 1*n* of the other of the battery cells 1 that are disposed at both ends of the plurality of battery cells 1 making up the battery cell group 10 in the stacking direction (x-axis direction) to the negative module terminal 101N.

In one example, the fuse 2a of the bus bar 2 is a part having a smallest volume in the current path of the bus bar 2B connecting the cell terminals 1p, 1n of the battery cells 1 and the module terminals 101P, 101N. In the example shown in FIG. 5, the bus bar 2 is a plate-like member made of metal, such as aluminum, copper or iron. The bus bar 2 has a slot 2b extending in the width direction (y-axis direction) of the battery cells 1 while leaving both ends of the bus bar 2. The slot 2b of the bus bar 2 extends substantially in parallel to the width direction (y-axis direction) of the battery cells 1 that is perpendicular to the thickness direction (x-axis direction) and the height direction (z-axis direction) of the battery cells 1 making up the battery cell group 10. The both ends of the bus bar 2 other than the slot 2b that extends in the width direction (y-axis direction) of the battery cells 1 define the fuse 2a having a smallest volume in the current path of the bus bar 2.

In one example, the bus bar 2 has a pair of connections 2c having flat faces and a bent 2d located between the pair of connections 2c and bent in the direction intersecting the connections 2c. In one example, the fuse 2a is disposed at the bent 2d. In another example, the fuse 2a may be disposed at the connections 2c. In the battery module 100 of the present embodiment shown in FIG. 3 to FIG. 5, the fuse 2a is formed with the slot 2b at the corner between the bent 2d and one of the connections 2c and so extends across both of the bent 2d and the connection 2c.

As shown in FIG. 1, the housing 20 of the battery module 100 of the present embodiment has the supported face 20a that is supported by the external mechanism. The battery module 100 of the present embodiment is configured so that the connections 2c of the bus bar 2 are substantially parallel to the supported face 20a of the housing 20. The battery module 100 of the present embodiment is configured so that the upper end faces of the cell terminals 1p and 1n of the plurality of battery cells 1 making up the battery cell group 10 also are substantially parallel to the supported face 20a of the housing 20.

The structure of the bus bar 2B is not limited to the one shown in FIG. 5. FIGS. 6 to 9 are perspective views of Modified Example 1 to Modified Example 4 of the bus bar 2B shown in FIG. 5.

Figure 6:
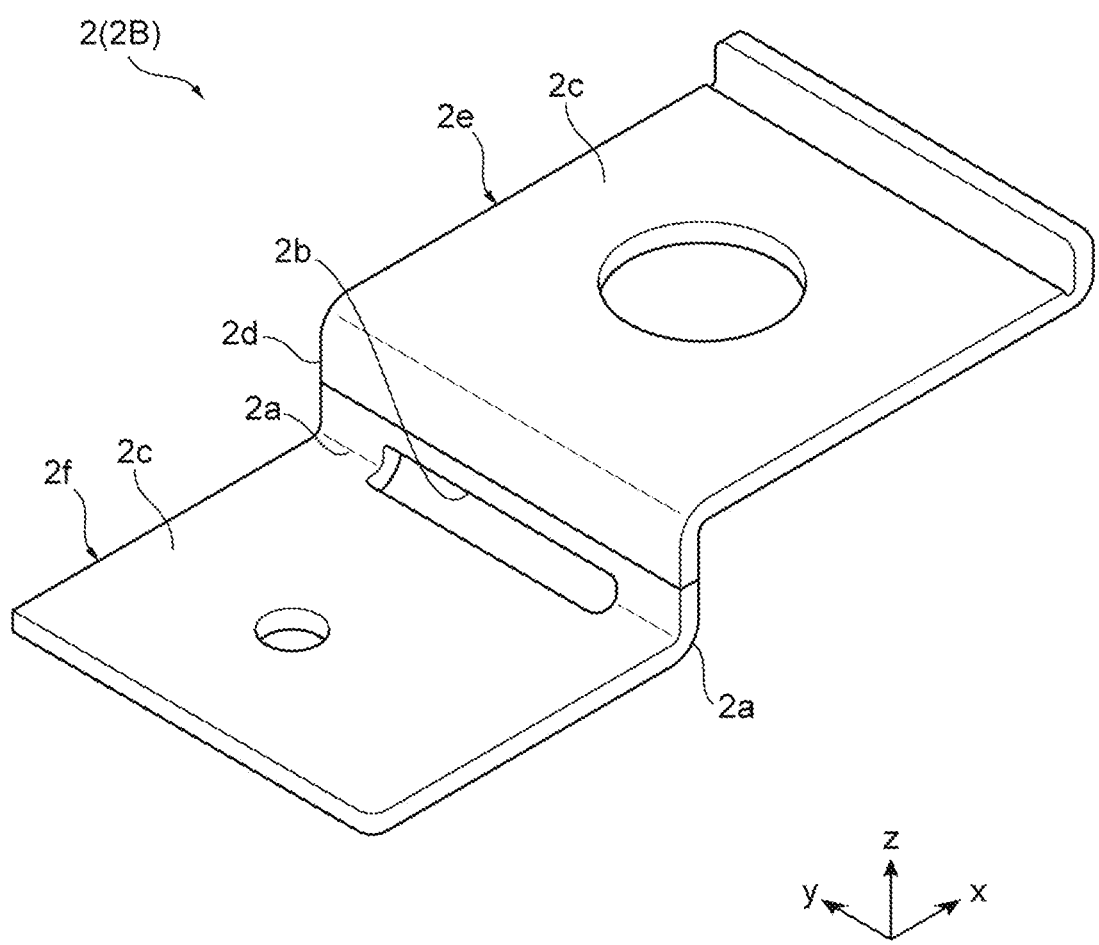
FIG. 6 is a perspective view of a modified example 1 of the bus bar in FIG. 5.

The bus bar 2B as Modified Example 1 in FIG. 6 includes a clad material prepared by bonding a copper part 2e made of copper and an aluminum part 2f made of aluminum, and a fuse 2a disposed at the aluminum part 2f. Specifically the aluminum part 2f of the bus bar 2B in Modified Example 1 extends from the connection 2c connecting to the cell terminal 1p or 1n to some midpoint of the bent 2d in the height direction (z-axis direction) of the battery cells 1. The copper part 2e extends from the some midpoint of the bent 2d in the height direction (z-axis direction) of the battery cells 1 to the connection 2c connecting to the module terminal 101P or 101N. In one example, the fuse 2a extends across the connection 2c and the bent 2d of the aluminum part 2f.

Figure 7:
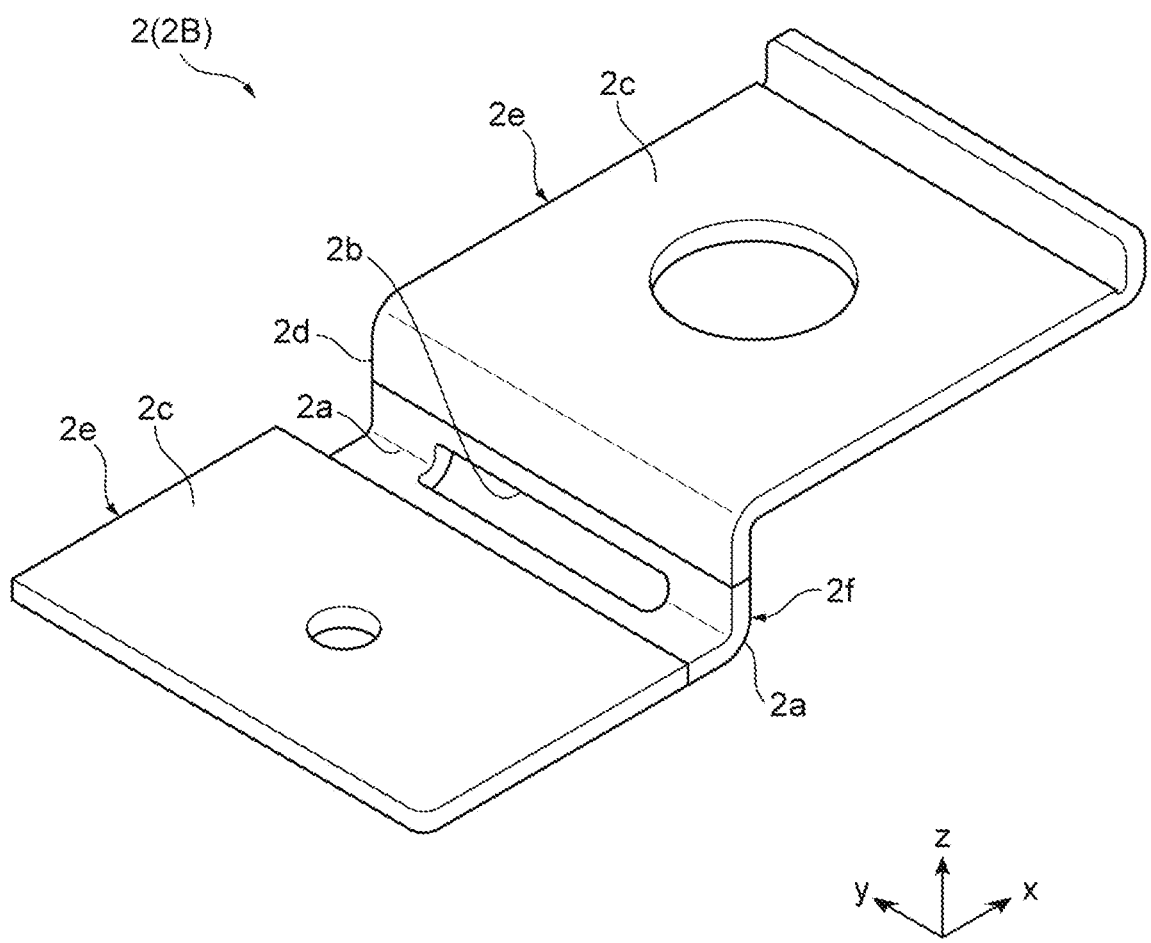
FIG. 7 is a perspective view of a modified example 2 of the bus bar in FIG. 5.

Similarly to Modified Example 1, the bus bar 2B as Modified Example 2 in FIG. 7 includes a clad material prepared by bonding a copper part 2e made of copper and an aluminum part 2f made of aluminum, and a fuse 2a disposed at the aluminum part 2f. Specifically, in the bus bar 2B of Modified Example 2, the aluminum part 2f made of aluminum includes a part of the bent 2d other than the upper part in the height direction (z-axis direction) of the battery cells 1. The copper part 2e includes a connection 2c having a flat face and connecting to the cell terminal 1p or 1n, and a part extending from the upper end of the bent 2d in the height direction (z-axis direction) of the battery cells 1 to the connection 2c connecting to the module terminal 101P or 101N.

The bus bar 2B of Modified Example 2 in FIG. 7 is configured so that the lower connection 2c in the height direction (z-axis direction) of the battery cells 1 is welded to the negative cell terminal 1n of the battery cell 1 located at the lowest voltage potential of the plurality of battery cells 1 making up the battery cell group 10. The bus bar 2B of Modified Example 2 in FIG. 7 is configured so that the upper connection 2c in the height direction (z-axis direction) of the battery cells 1 is welded to the negative module terminal 101N shown in FIG. 2.

The connection 2c welded to the negative cell terminal 1n of the battery cell 1 has a dimension in the width direction (y-axis direction) of the battery cells 1 that is larger than the dimension in the same direction of the connection 2c connecting to the negative module terminal 101N, and the connection 2c welded to the negative cell terminal 1n protrudes in the width direction (y-axis direction). The fuse 2a of this modified example may be configured as in the following Modified Example 3 or 4.

Figure 8:
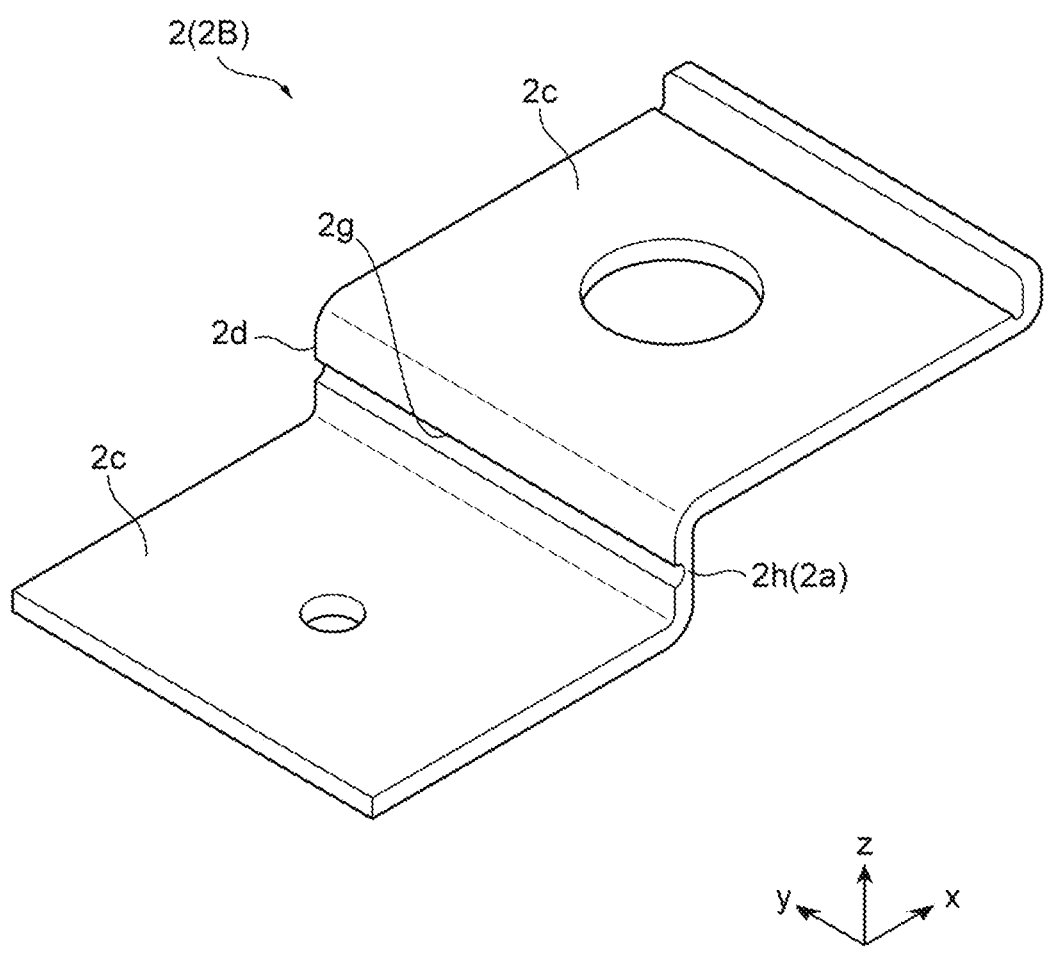
FIG. 8 is a perspective view of a modified example 3 of the bus bar in FIG. 5.

The bus bar 2B as Modified Example 3 shown in FIG. 8 has a half cylindrical recessed group 2g traversing the bus bar 2B in the width direction (y-axis direction) of the battery cells 1 at the intermediate part of the bent 2d in the height direction (z-axis direction) of the battery cells 1, for example. The bus bar 2B has a thin part 2h at the bottom of this recessed groove 2g that is thinner than the other part. This thin part 2h defines the fuse 2a having a smallest volume in the current path of the bus bar 2B.

Figure 9:
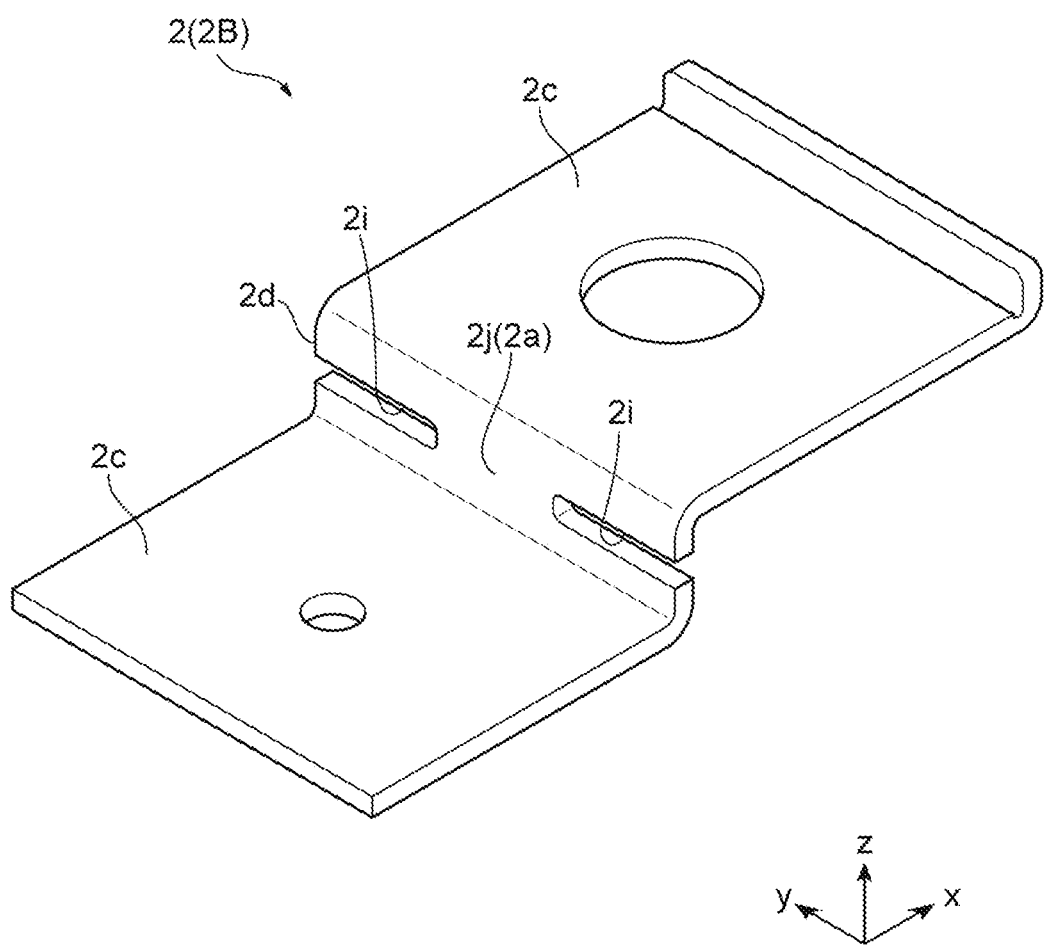
FIG. 9 is a perspective view of a modified example 4 of the bus bar in FIG. 5.

The bus bar 2B as Modified Example 4 shown in FIG. 9 has cut-outs 2i at the intermediate part of the bent 2d in the height direction (z-axis direction) of the battery cells 1, for example. The cut-outs 2i extend from both ends of the bus bar 2B to the intermediate part in the width direction (y-axis direction) of the battery cells 1. The intermediate part as a constricted part 2j left between the cut-outs 2i of the bus bar 2B defines the fuse 2a having a smallest volume in the current path of the bus bar 2B.

As stated above, the battery module 100 includes the housing 20 that stores the plurality of battery cells 1. As shown in FIG. 4, the space S for allowing the molten fuse 2a to fall is defined by the battery cell 1 and the housing 20. Specifically the space S below the fuse 2a is an internal space of the housing 20 defined by the cell terminal 1p or 1n and the cell case 1a of the battery cell 1 and the cell holder 21 of the housing 20, for example.

As described above, the plurality of battery cells 1 making up the battery cell group 10 of the battery module 100 each have the cell terminals 1p and 1n that protrude perpendicularly (z-axis direction) to the supported face 20a. The connection 2c of the bus bar 2B connects to the protruding end face of the cell terminal 1p or 1n that is parallel of the supported face 20a. The space S below the fuse 2a faces the lower face of the bus bar 2B opposed to the battery cell 1, and has a depth that is equal to or longer than the height of the cell terminal 1p or 1n in the direction perpendicular to (z-axis direction) the supported face 20a of the housing 20.

The following describes advantageous effects of the battery module 100 according to the present embodiment.

The battery module 100 of the present embodiment is mounted on an external mechanism, such as a vehicle or a machine, and connects to an electric generator or an electric motor of the external mechanism via the module terminals 101P and 101N. This allows the battery module 100 to exchange electricity between the plurality of battery cells 1 making up the battery cell group 10 and the electric generator or the electric motor of the external mechanism. If any abnormality occurs in the battery cells 1 making up the battery cell group 10 of the battery module 100, and excessive current flows through the bus bar 2 having the fuse 2a, the fuse 2a reaches the melting point of the metal of the bus bar 2 due to the Joule heat, and so melts and cuts.

The conventional battery module and electric storage device described in Patent Literature 1 and Patent Literature 2 as stated above melt and cut the fuse during short-circuit, and open the short-circuit. Molten metal resulting from the molten fuse, however, may form a new current path, and this may cause short-circuit again. More specifically the conventional battery module and electric storage device as stated above include cylindrical secondary cells. Such cylindrical secondary cells each have the positive terminal and the negative terminal at both ends in the axial direction that is the longitudinal direction, and the housing of the secondary cell has potential equal to that of the negative terminal, for example. The case of the secondary cell is present below the fuse. This means that the molten and cut fuse causes the molten metal to adhere to the case of the secondary cell and the positive terminal, and this may form a new current path between the positive terminal and the negative terminal of the secondary cell.

On the contrary, the battery module 100 of the present embodiment includes: the module terminals 101P and 101N; the battery cell group 10 including the plurality of battery cells 1; and the bus bars 2 connecting the plurality of battery cells 1 of this battery cell group 10 and connecting this battery cell group 10 with the module terminals 101P and 101N as stated above. At least one of the plurality of bus bars 2 has the fuse 2a, and the battery module has a space S below the fuse 2a for allowing the molten fuse 2a to fall. If excessive current flows through the bus bar 2 and the metal of the fuse 2a melts due to the Joule heat, the fuse 2a falls down due to the action of gravity. At this time, the fuse 2a will fall into the space S that is located below the fuse 2a and that allows the molten fuse 2a to fall. The battery module 100 of the present embodiment therefore prevents a new current path that may be formed due to molten metal resulting from a molten and cut fuse 2a, and has better safety than conventional battery modules.

The battery module 100 of the present embodiment includes the housing 20 to hold the plurality of battery cells 1 making up the battery cell group 10. The space S for allowing the molten fuse 2a to fall is defined by the battery cell 1 and the housing 20. In this way, the battery module 100 has the space S having volume sufficiently larger than the volume of the fuse 2a, and prevents the formation of a new current path between the positive cell terminal 1p and the negative cell terminal 1n of the battery cell 1 due to the molten and fallen fuse 2a more reliably.

In the battery module 100 of the present embodiment, the bus bar 2 has the pair of connections 2c having flat faces and the bent 2d located between the pair of connections 2c and bent in the direction intersecting the connections 2c. This configuration allows for a difference in position between the cell terminals 1p and 1n of the battery cells 1 and the module terminals 101P and 101N in the height direction (z-axis direction) of the housing 20, and the bent 2d of the bus bar 2 compensates for such a difference in position so as to enable the bus bar 2B to connect the cell terminal 1p and 1n to the module terminals 101P and 101N.

In the battery module 100 of the present embodiment, the fuse 2a of the bus bar 2 is disposed at the bent 2d of the bus bar 2. In this way, the battery module 100 includes the fuse 2a at the bent 2d between the connections 2c connecting to the cell terminal 1p or 1n of the battery cell 1 and the module terminal 101P or 101N, and this allows the fuse 2a to be disposed in a limited space between the cell terminal 1p or 1n of the battery cell 1 and the module terminal 101P or 101N. This configuration therefore prevents the molten metal that is the molten fuse 2a fallen below from adhering to the cell terminal 1p or 1n or to the module terminal 101P or 101N.

In the battery module 100 of the present embodiment, the fuse 2a of the bus bar 2 is disposed at the connection 2c. In this way the fuse 2a disposed at the connection 2c of the bus bar 2 allows the fuse 2a to extend in the direction intersecting the vertical direction, i.e., in the direction along the horizontal direction. This facilitates the falling-down of the molten fuse 2a. Also, this facilitates the formation of the fuse 2a and the bent 2d when forming the slot 2b at the bus bar 2 to provide the fuse 2a. Specifically the slot 2b may be formed in the bus bar 2 having a flat face to give the fuse 2a, and then the fuse 2a may be bent to form the bent 2d.

In the battery module 100 of the present embodiment, the housing 20 has the supported face 20a supported by the external mechanism, and the connections 2c of the bus bar 2 are parallel to the supported face 20a of the housing 20. When the external mechanism to mount the battery module 100 is placed at a horizontal place, the supported face 20a of the housing 20 in the battery module 100 is substantially parallel to the horizontal plane. In this way the connections 2c of the bus bar 2 are parallel to the supported face 20a of the housing 20, and when the external mechanism to mount the battery module 100 is placed on a horizontal place, this allows the connections 2c of the bus bar 2 to be substantially parallel to the horizontal plane.

In the battery module 100 of the present embodiment, each battery cell 1 has the cell terminals 1p and 1n that protrude in the direction perpendicular to the supported face 20a of the housing 20 (z-axis direction). The connection 2c of the bus bar 2 connects to the protruding end face of the cell terminal 1p or 1n that is parallel of the supported face 20a. The space S below the fuse 2a faces the lower face of the bus bar 2 opposed to the battery cell 1, and has a depth that is equal to or longer than the height of the cell terminal 1p or 1n in the direction perpendicular to the supported face 20a. This configuration keeps a sufficient space in the limited space in the housing 20 of the battery module 100 for allowing the molten fuse 2a to fall.

In the battery module 100 of the present embodiment, the bus bar 2 may include a clad material prepared by bonding the copper part 2e made of copper and the aluminum part 2f made of aluminum as stated above, and the fuse 2a may be disposed at the aluminum part 2f. In this case, the connections 2c as a pair may include different materials. This avoids welding of dissimilar materials with the cell terminals 1p, 1n. Additionally the fuse 2a is disposed at the aluminum part that is stronger than the copper part 2e, which suppresses deterioration of strength of the bus bar 2.

In the battery module 100 of the present embodiment, the bus bar 2 may include the thin part 2h that is thinner than the other part as stated above, and this thin part 2h may define the fuse 2a having a smallest volume in the current path of the bus bar 2. When one of the connections 2c as a pair of the bus bar 2 connects to the cell terminal 1p or 1n of the battery cell 1 by welding and the other connection 2c is fastened to the module terminal 101P or 101N via a fastener, such as a bolt, this configuration improves the strength of the bus bar 2 against torsion.

In the battery module 100 of the present embodiment, the bus bar 2 may include the constricted part 2*j* left between the cut-outs 2*i* as stated above, and this constricted part 2*j* may be the fuse 2*a* having the smallest volume in the current path of the bus bar 2. This configuration facilitates the control of the time to melt and cut the fuse 2*a* as compared with the configuration of having the fuse 2*a* on both sides of the slot 2*b*. This is because the current path can be concentrated on the intermediate part only that is the constricted part 2*j* between the cut-outs 2*i* as compared with the configuration having the fuse 2*a* on both sides of the slot 2*b* and having the current path branching into two ways.

The battery module 100 of the present embodiment is configured so that the flattened rectangular battery cells 1 making up the battery cell group 10 are stacked in the thickness direction (x-axis direction), and the module terminals 101P and 101N are disposed at both ends of the battery cell group 10 in the stacking direction (x-axis direction) of the battery cells 1. This configuration improves the volumetric efficiency of the battery cell group 10 and enables high-performance battery module 100. This also effectively utilizes the space between the battery cell 1 and the housing 20 to form the space S for allowing the molten fuse 2*a* to fall.

As described above, the present embodiment provides the battery module 100 that prevents a new current path that may be formed due to molten metal resulting from a molten and cut fuse 2*a* of the bus bar 2, and has better safety than conventional battery modules.

Embodiment 2

Figure 10:
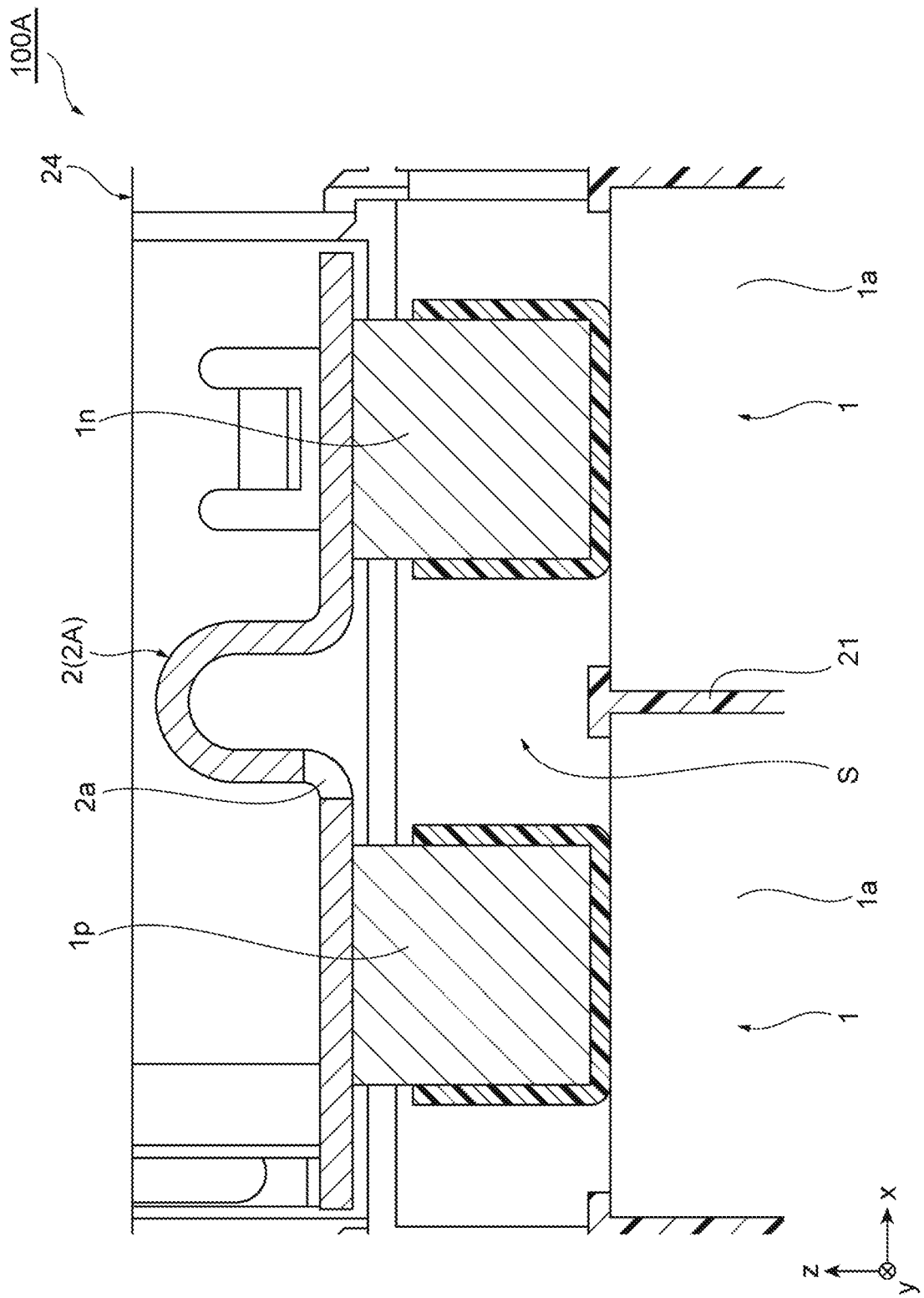
FIG. 10 is an enlarged cross-sectional view of a battery module according to Embodiment 2 of the present invention.
Figure 11:
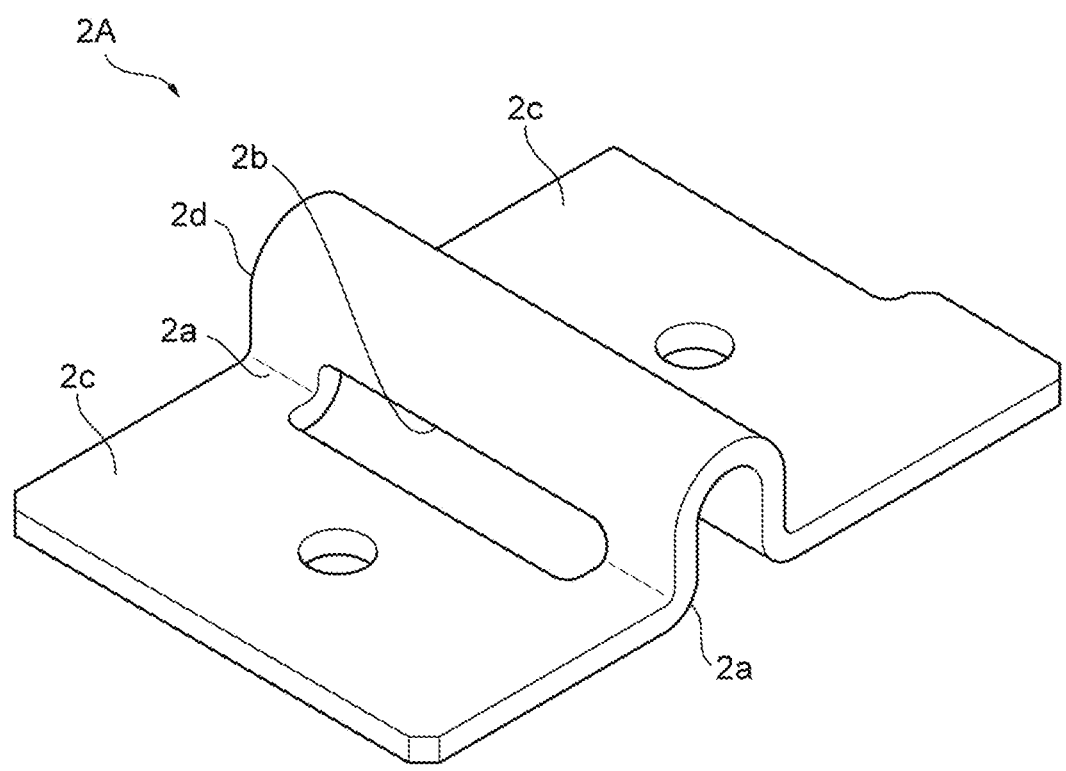
FIG. 11 is a perspective view of a bus bar shown in FIG. 10.
Figure 11:
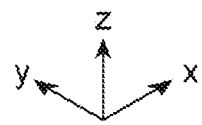

Next referring to FIG. 10 and FIG. 11 together with FIG. 1, FIG. 2 and FIG. 6 to FIG. 8, the following describes a battery module 100A according to Embodiment 2 of the present invention. FIG. 10 is an enlarged cross-sectional view of the battery module 100A according to Embodiment 2 of the present invention. FIG. 11 is a perspective view of a bus bar 2A shown in FIG. 10.

The battery module 100A of the present embodiment is different from the battery module 100 of Embodiment 1 as stated above in that the bus bar 2A between a plurality of battery cells 1 of a battery cell group 10 to connect the battery cells 1 has a fuse 2*a*. Since the battery module 100A of the present embodiment is similar to the battery module 100 of Embodiment 1 in other respects, the same numerals therefore indicate like parts, and their descriptions are omitted.

In the battery module 100A of the present embodiment, at least one of the plurality of bus bars 2A between the battery cells 1 has a fuse 2*a*. The battery module 100A has a space S that is located below the fuse 2*a* and that allows the molten fuse 2*a* to fall. The space S is defined by a pair of cell terminals 1*p* and 1*n* of a pair of battery cells 1, their cell cases 1*a*, and the cell holder 21 of the housing 20. The bus bar 2 has a pair of connections 2*c* having flat faces and a bent 2*d* located between the pair of connections 2*c* and bent in the direction intersecting the connections 2*c*.

The fuse 2*a* of the bus bar 2 is defined by a slot 2*b* of the bus bar 2 so as to extend across the bent 2*d* and the connection 2*c*. In the battery module 100A of the present embodiment as well, the bus bar 2A may include a clad material shown in FIG. 6 and FIG. 7, or the fuse 2*a* may be formed at the bent 2*d* with the thin part 2*h* shown in FIG. 8 or the constricted part 2*j* shown in FIG. 9.

The battery module 100A of the present embodiment achieves the same advantageous effects from the battery module 100 of Embodiment 1 as stated above. The battery module 100A may include the fuses 2*a* disposed at the bus bars 2A connecting the plurality of battery cells 1 of the battery cell group 10 as well as at the bus bars 2B connecting the battery cell group 10 to the module terminals 101P and 101N.

Embodiment 3

Figure 12:
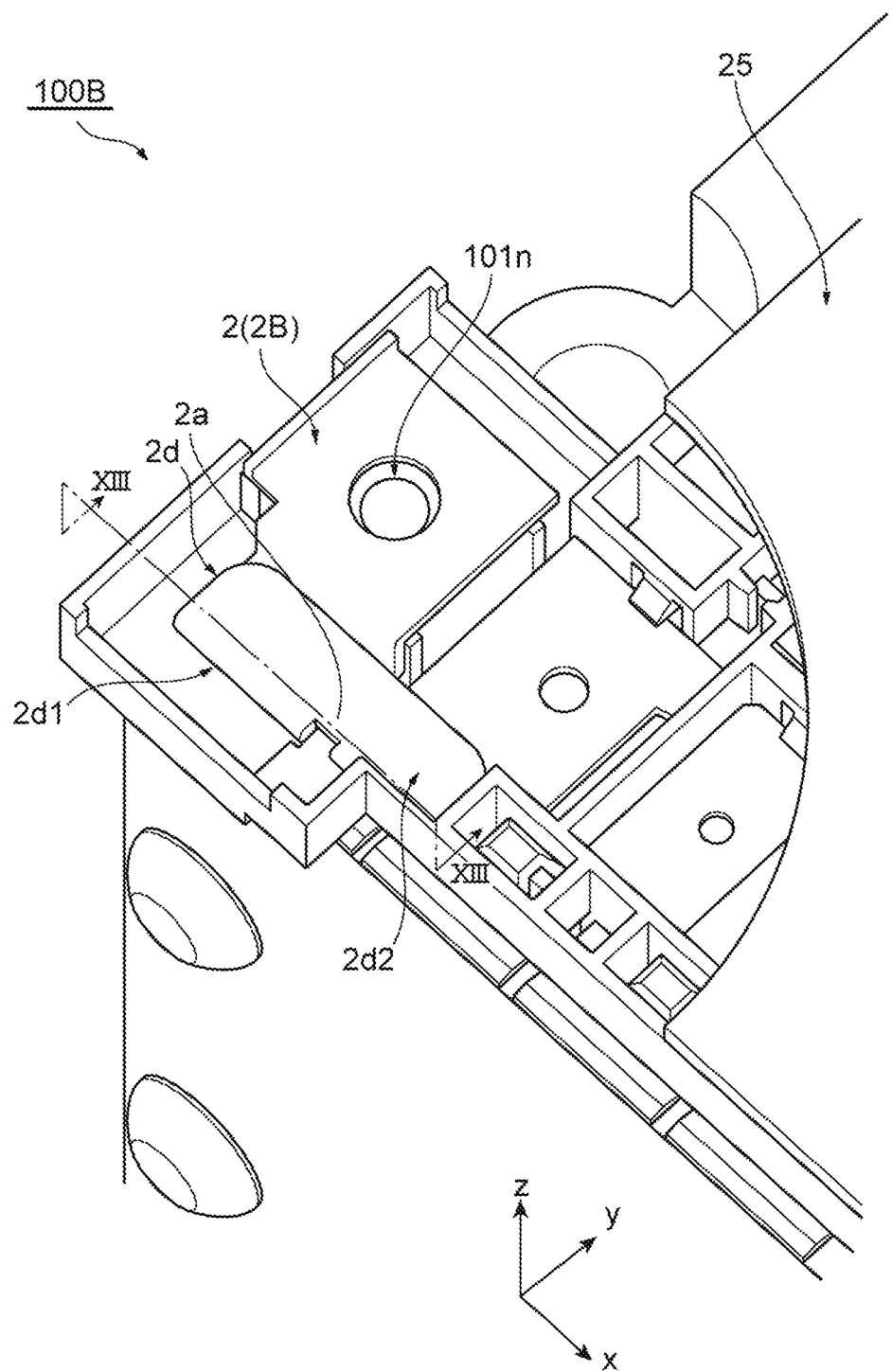
FIG. 12 is an enlarged perspective view of a battery module according to Embodiment 3 of the present invention.
Figure 13:
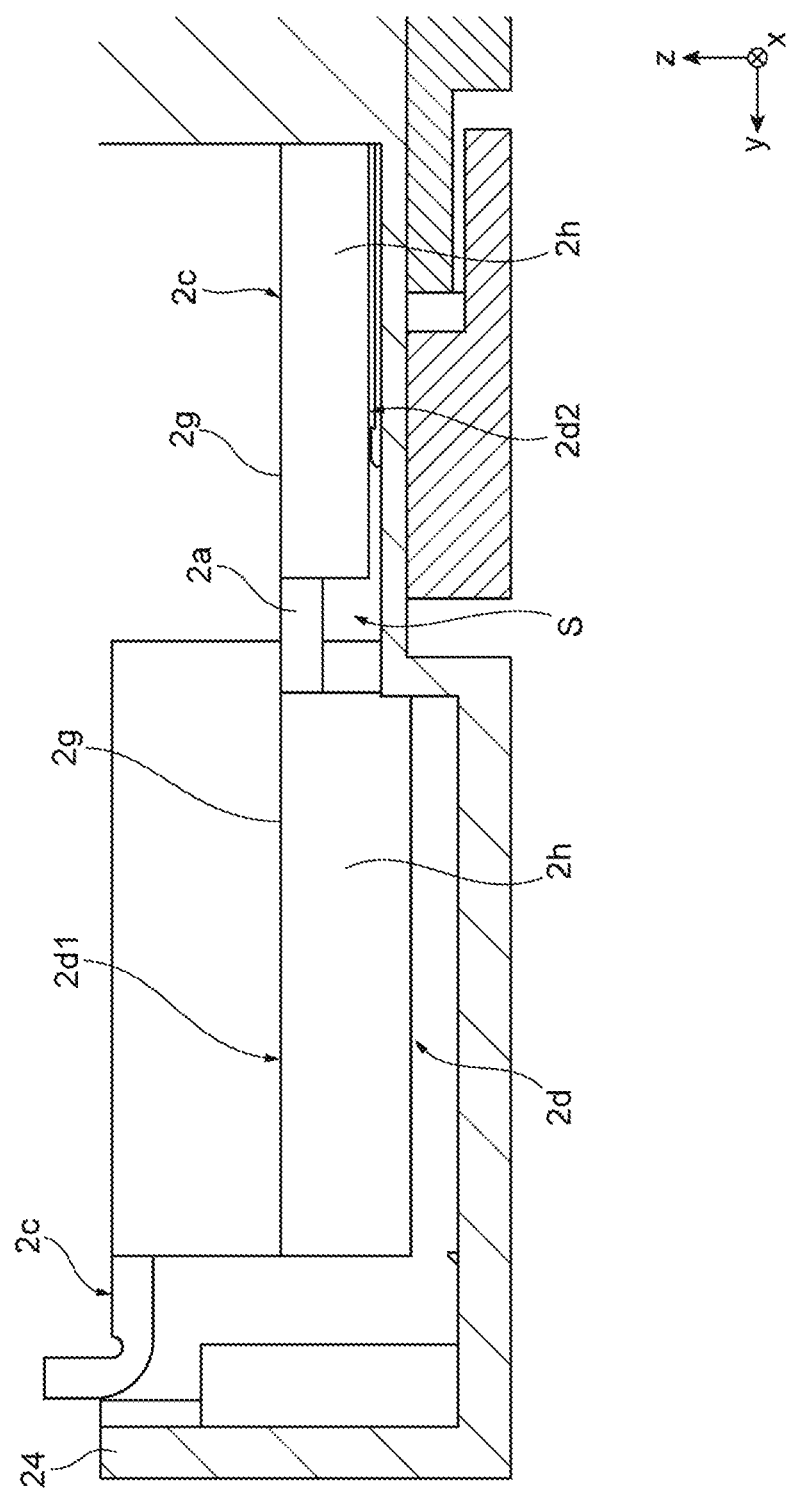
FIG. 13 is an enlarged cross-sectional view taken along the line XIII-XIII of FIG. 12.
Figure 14:
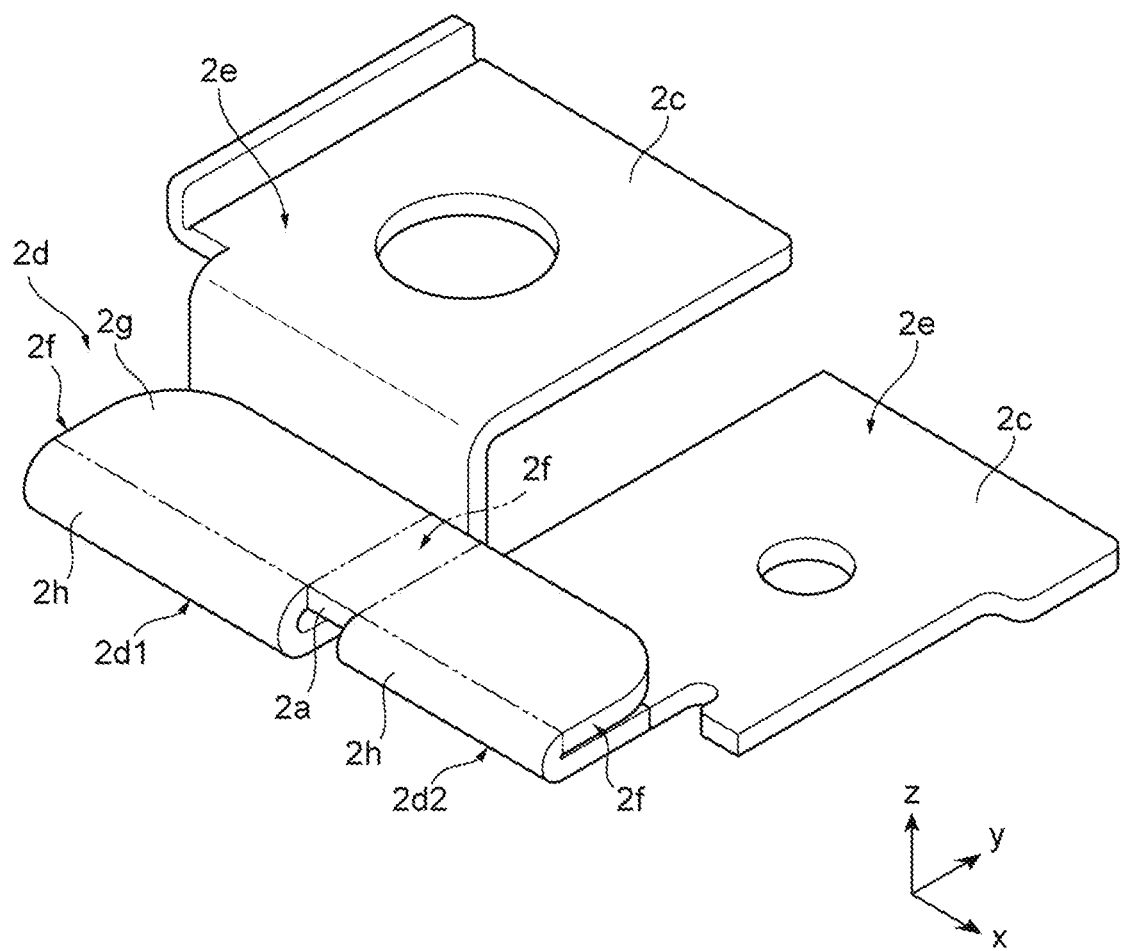
FIG. 14 is a perspective view of the bus bar connecting to the module terminal shown in FIG. 12.

Next referring to FIG. 12 to FIG. 14 together with FIG. 1 and FIG. 2, the following describes a battery module 100B according to Embodiment 3 of the present invention. FIG. 12 is an enlarged perspective view of the battery module 100B according to Embodiment 3 of the present invention. FIG. 13 is an enlarged cross-sectional view taken along the line XIII-XIII of FIG. 12. FIG. 14 is a perspective view of the bus bar 2B connecting to the module terminal 101N shown in FIG. 12. FIG. 12 shows the module cover 25 that is partially cut out at the terminal cover.

In the battery module 100B of the present embodiment, the fuse 2*a* is disposed at the bus bar 2B connecting the battery cell group 10 to the negative module terminal 101N. The fuse 2*a* of the bus bar 2B is a part having a smallest current-carrying area in the current path of the bus bar 2B connecting the negative cell terminal 1*n* of the battery cell 1 to the negative module terminal 101N. The battery module 100B of the present embodiment has a space S that is located below the fuse 2*a* of the bus bar 2B and that allows the molten fuse 2*a* to fall.

The bus bar 2 has a pair of connections 2*c* having flat faces and a bent 2*d* located between the pair of connections 2*c* and bent in the direction intersecting the connections 2*c*. Specifically the bent 2*d* has a first bent 2*d*1, a second bent 2*d*2, and a fuse 2*a* connecting these bents.

The first bent 2*d*1 connects to one side of the connection 2*c* that is disposed at the bus bar 2B above in the height direction (z-axis direction) of the battery cells 1 and connects to the negative module terminal 101N. The first bent 2*d*1 bends downward in the height direction (z-axis direction) of the battery cells 1 from the one side of the connection 2*c* that is outside in the width direction of the battery cells 1 (on the negative-direction side in y-axis direction shown in FIG. 12 and FIG. 14) so as to have an L-letter shape at substantially right angle relative to the connection 2*c*.

The first bent 2*d*1 then extends downward in the height direction (z-axis direction) of the battery cells 1 from the one side of the connection 2*c* and bends outward in the width direction of the battery cells 1 so as to have an L-letter shape at substantially right angle. The first bent 2*d*1 has a folded part 2*h* that is folded back like a U-letter shape toward the 180° opposite direction so as to overlap the part extending outward in the width direction of the battery cells 1. The first bent 2*d*1 has a bridge 2*g* that extends inward in the width direction of the battery cells 1 (to the positive-direction side in y-axis direction shown in FIG. 12 and FIG. 14) from the folded part 2*h*. The bridge 2*g* of the first bent 2*d*1, which is folded back inward in the width direction of the battery cells 1, connects to a bridge 2*g* of the second bent 2*d*2 via the fuse 2*a*.

The second bent 2*d*2 connects to one side of the connection 2*c* that is disposed at the bus bar 2B below in the height direction (z-axis direction) of the battery cells 1 and connects to the cell terminal 1*n* of the battery cell 1. The second bent 2*d*2 connects to the one side of the connection 2*c* that is outside of the connection 2*c* in the width direction of the battery cells 1 (on the negative-direction side in y-axis direction shown in FIG. 12 and FIG. 14) and extends outward in the width direction of the battery cells 1 from the one side of the connection 2c.

The second bent 2d2 has a folded part 2h that is folded back like a U-letter shape toward the 180° opposite direction so as to overlap the part extending outward in the width direction of the battery cells 1. The second bent 2d2 has the bridge 2g that extends inward in the width direction of the battery cells 1 (to the positive-direction side in y-axis direction shown in FIG. 12 and FIG. 14) from the folded part 2h. The bridge 2g of the second bent 2d2, which is folded back inward in the width direction of the battery cells 1, connects to the bridge 2g of the first bent 2d1 via the fuse 2a.

The fuse 2a connecting the bridge 2g of the first bent 2d1 and the bridge 2g of the second bent 2d2 has the current-carrying area that is smaller than the current-carrying areas of the first bent 2d1 and the second bent 2d2.

In one example, the two connections 2c, a part of the first bent 2d1, and a part of the second bent 2d2 in the bus bar 2B are copper parts 2e made of copper. Specifically the copper part 2e includes the connection 2c connecting to the negative module terminal 101N and the connection 2c connecting to the cell terminal 1n of the battery cell 1. The copper part 2e also includes a part of the first bent 2d1 that bends by 90° along the one side of the connection 2c and extends downward in the height direction of the battery cells 1 (z-axis direction), bends again by 90° to extend outward in the width direction of the battery cells 1, and bends by 180° in the opposite direction as well. The copper part 2e also includes a part of the second bent 2d2 that extends outward in the width direction of the battery cells 1 from the one side of the connection 2c and bends by 180° in the opposite direction as well.

In one example, the remainder of the first bent 2d1, the fuse 2a, and the remainder of the second bent 2d2 of the bus bar 2B are aluminum parts 2f made of aluminum. Specifically the aluminum part 2f includes a part of the first bent 2d1 that is a flat part extending inward in the width direction of the battery cells 1 from the 180° bent part, a part of the second bent 2d2 extending inward in the width direction of the battery cells 1 from the 180° bent part, and the fuse 2a between these parts. These copper parts 2e and aluminum parts 2f are bonded by clad bonding, for example.

The two connections 2c and a part of the first bent 2d1 of the bus bar 2B may be the copper parts 2e made of copper. Specifically the copper part 2e includes the two connections 2c, and a part of the first bent 2d1 that extends downward in the height direction of the battery cells 1 (z-axis direction) from the one side of the connection 2c that connects to the negative module terminal 101N and bends outward in the width direction of the battery cells 1.

In one example, the remainder of the first bent 2d1, the fuse 2a, and the second bent 2d2 as a whole of the bus bar 2B may be aluminum parts 2f made of aluminum. Specifically the aluminum part 2f may include a part of the first bent 2d1 that extends outward in the width direction of the battery cells 1, bends by 180° in the opposite direction, and extends inward in the width direction of the battery cells 1, the fuse 2a and the second bent 2d2.

This embodiment includes the folded parts 2h due to the space in the insulation cover 24 to store the bus bar. In another embodiment having a larger space to store the bus bar, the bus bar may omit the folded parts 2h. When the bus bar is designed so that the negative module terminal 101N and the negative cell terminal 1n are at the same height, the bent 2d also can be omitted. In this case, the bus bar 2B may include a pair of connections 2c and bridges 2g.

The present embodiment as stated above allows the fuse 2a to be positioned away from the cell terminal 1n as compared with Embodiment 1. This embodiment therefore prevents the formation of a new current path that may be formed due to molten metal when the fuse 2a of the bus bar 2B melts and cuts, and has better safety.

That is a detailed description of the embodiments of the present invention with reference to the drawings. The specific configuration of the present invention is not limited to the above-stated embodiments, and the design may be modified variously without departing from the spirits of the present invention. The present invention also covers such modified embodiments.

REFERENCE SIGNS LIST

1 Battery cell
1p Cell terminal
1n Cell terminal
2 Bus bar
2A Bus bar
2B Bus bar
2a Fuse
2C Connection
2d Bent
2e Copper part
2f Aluminum part
10 Battery cell group
100 Battery module
20 Housing
20a Supported face
101P Module terminal
101N Module terminal
S Space

The invention claimed is:
1. A battery module comprising:
  module terminals;
  a battery cell group including a plurality of battery cells;
  a plurality of bus bars connecting the plurality of battery cells of the battery cell group in series with each other and connecting the battery cell group with the module terminals; and
  a housing including a supported face that is supported by an external mechanism, wherein
  at least one of the plurality of bus bars having a fuse,
  the battery module having a space below the fuse and the space allowing a molten form of the fuse, or a portions thereof to fall without contacting any of the plurality of bus bars,
  each of the battery cells has a cell terminal that protrudes in a direction perpendicular to the supported face, and
  the space faces a lower face of the at least one of bus bar opposed to the one of the battery cells, and has a depth that is equal to or longer than a height of the cell terminal in a direction perpendicular to the supported face.
2. The battery module according to claim 1, wherein the housing holds the plurality of battery cells, and
  the space is defined by at least one of the plurality of battery cells and the housing.
3. The battery module according to claim 2, wherein each of the plurality of bus bars has a pair of connections having flat faces and a bent located between the pair of connections and bent in a direction intersecting the connections.
4. The battery module according to claim 3, wherein the fuse is disposed at the bent.

5. The battery module according to claim 4, wherein the bent has a first bent and a second bent that extend downward in a height direction of the battery cells from one side of one of the connections and one side of the other connection, respectively, and bend outward in a width direction of the battery cells, each of the first bent and the second bent has a folded part where a part of the bent extending outward in the width direction of the battery cells is folded back upward in the height direction of the battery cells, and a bridge that extends inward in the width direction of the battery cells from the folded part, and the bridge of the first bent and the bridge of the second bent is connected via the fuse.

6. The battery module according to claim 3, wherein the fuse is disposed at the connections.

7. The battery module according to claim 3, wherein the connections are parallel to the supported face.

8. The battery module according to claim 7, wherein one of the connections of at least one of the bus bars connects to a protruding end face of the cell terminal of one of the battery cells that is parallel with the supported face.

9. The battery module according to claim 1, wherein at least one of the bus bars includes a clad material including a copper part made of copper and an aluminum part made of aluminum that are bonded, and the fuse is disposed at the aluminum part.

10. The battery module according to claim 1, wherein the fuse is a part having a smallest volume in a current path of the bus bar.

11. The battery module according to claim 1, wherein the battery cell group includes the battery cells each having a flattened rectangular shape that are stacked in a thickness direction, and the module terminals are disposed at both ends of the battery cell group in a stacking direction of the battery cells.

* * * * *